United States Patent
Lee et al.

(10) Patent No.: US 8,072,938 B2
(45) Date of Patent: Dec. 6, 2011

(54) METHOD FOR HANDOVER IN MOBILE COMMUNICATION SYSTEM

(75) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 404 days.

(21) Appl. No.: 12/159,845

(22) PCT Filed: Nov. 3, 2006

(86) PCT No.: PCT/KR2006/004571
§ 371 (c)(1),
(2), (4) Date: Nov. 17, 2008

(87) PCT Pub. No.: WO2007/078051
PCT Pub. Date: Jul. 12, 2007

(65) Prior Publication Data
US 2009/0129335 A1  May 21, 2009

(30) Foreign Application Priority Data

Sep. 5, 2006  (KR) .................. 10-2006-0085190

(51) Int. Cl.
*H04W 4/00* (2009.01)
*H04W 36/00* (2009.01)
(52) U.S. Cl. .................................. 370/331; 455/436
(58) Field of Classification Search .................. None
See application file for complete search history.

(56) References Cited

U.S. PATENT DOCUMENTS

| | | | |
|---|---|---|---|
| 5,659,756 A | 8/1997 | Hefferon et al. |
| 5,828,677 A | 10/1998 | Sayeed et al. |
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |

(Continued)

FOREIGN PATENT DOCUMENTS

CN  1315121  9/2001

(Continued)

OTHER PUBLICATIONS

Haardt, M., et al., "The TD-CDMA Based UTRA TDD Mode," IEEE Journal on Selected Areas in Communications, vol. 18, No. 8, pp. 1375-1385, Aug. 2000.

(Continued)

*Primary Examiner* — Chirag Shah
*Assistant Examiner* — Srinivasa Reddivalam
(74) *Attorney, Agent, or Firm* — Lee, Hong, Degerman, Kang & Waimey

(57) ABSTRACT

A method and apparatus is provided to enable a network to more efficiently determine whether additional reverse links can be assigned. Various methods are presented that allow a network to determine either the transmission power or power headroom of a mobile terminal based on information that is provided at session startup and information provided periodically. The number of additional reverse links that can be assigned to the mobile can then be estimated from the transmission power and head-room of the mobile terminal.

13 Claims, 6 Drawing Sheets

U.S. PATENT DOCUMENTS

| | | |
|---|---|---|
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,031,708 B2 | 4/2006 | Sarkkinen et al. |
| 7,075,971 B2 | 7/2006 | Parsa et al. |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,359,345 B2 | 4/2008 | Chang et al. |
| 7,359,349 B2 | 4/2008 | Kayama et al. |
| 7,385,952 B2 | 6/2008 | Mantha et al. |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,664,059 B2 | 2/2010 | Jiang |
| 7,778,599 B2 | 8/2010 | Li et al. |
| 7,826,855 B2 | 11/2010 | Chun et al. |
| 7,826,859 B2 | 11/2010 | Lee et al. |
| 2001/0024956 A1 | 9/2001 | You et al. |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0090004 A1 | 7/2002 | Rinchiuso |
| 2002/0093940 A1 | 7/2002 | Toskala et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0007510 A1 | 1/2003 | Yeo et al. |
| 2003/0035440 A1 | 2/2003 | Casaccia et al. |
| 2003/0050097 A1* | 3/2003 | Amirijoo et al. .............. 455/560 |
| 2003/0076812 A1 | 4/2003 | Benedittis |
| 2003/0078046 A1* | 4/2003 | Seo .............................. 455/436 |
| 2003/0103476 A1 | 6/2003 | Choi et al. |
| 2003/0139170 A1 | 7/2003 | Heo |
| 2003/0147371 A1 | 8/2003 | Choi et al. |
| 2003/0156624 A1 | 8/2003 | Null |
| 2003/0210669 A1 | 11/2003 | Vayanos et al. |
| 2003/0223393 A1 | 12/2003 | Lee |
| 2003/0236085 A1 | 12/2003 | Ho |
| 2004/0001452 A1 | 1/2004 | Day et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0014452 A1 | 1/2004 | Lim et al. |
| 2004/0028078 A1 | 2/2004 | Beckmann et al. |
| 2004/0077357 A1 | 4/2004 | Nakada |
| 2004/0103435 A1 | 5/2004 | Yi et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0143676 A1 | 7/2004 | Baudry et al. |
| 2004/0147271 A1 | 7/2004 | Billon et al. |
| 2004/0157602 A1 | 8/2004 | Khawand |
| 2004/0180675 A1 | 9/2004 | Choi et al. |
| 2004/0185860 A1 | 9/2004 | Marjelund et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0041573 A1 | 2/2005 | Eom et al. |
| 2005/0059407 A1* | 3/2005 | Reed et al. .............. 455/450 |
| 2005/0059421 A1 | 3/2005 | Reed et al. |
| 2005/0073987 A1 | 4/2005 | Wu |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0260997 A1 | 11/2005 | Korale et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0011953 A1 | 1/2006 | Nakahashi et al. |
| 2006/0018289 A1 | 1/2006 | Schulist et al. |
| 2006/0025079 A1 | 2/2006 | Sutskover et al. |
| 2006/0059186 A1 | 3/2006 | Backlund |
| 2006/0062196 A1 | 3/2006 | Cai et al. |
| 2006/0146745 A1 | 7/2006 | Cai et al. |
| 2006/0168343 A1 | 7/2006 | Ma et al. |
| 2006/0193282 A1 | 8/2006 | Ikawa et al. |
| 2006/0292982 A1 | 12/2006 | Ye et al. |
| 2007/0060146 A1 | 3/2007 | Won et al. |
| 2007/0121543 A1 | 5/2007 | Kuchibhotla et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1 | 9/2007 | Pajukoski et al. |
| 2008/0095105 A1 | 4/2008 | Sundberg et al. |
| 2008/0232291 A1 | 9/2008 | Hus et al. |
| 2008/0298322 A1 | 12/2008 | Chun et al. |
| 2008/0305819 A1 | 12/2008 | Chun et al. |
| 2009/0011718 A1 | 1/2009 | Chun et al. |
| 2009/0011769 A1 | 1/2009 | Park et al. |
| 2009/0016254 A1 | 1/2009 | Lee et al. |
| 2009/0047912 A1 | 2/2009 | Lee et al. |
| 2009/0052388 A1 | 2/2009 | Kim et al. |
| 2009/0109912 A1 | 4/2009 | DiGirolamo et al. |
| 2009/0163211 A1 | 6/2009 | Kitazoe et al. |
| 2009/0175241 A1 | 7/2009 | Ohta et al. |
| 2009/0185477 A1 | 7/2009 | Lee et al. |
| 2009/0201948 A1 | 8/2009 | Patwardhan et al. |
| 2009/0219868 A1 | 9/2009 | Lee et al. |
| 2009/0238141 A1 | 9/2009 | Damnjanovic et al. |
| 2009/0319850 A1 | 12/2009 | Baek et al. |
| 2010/0014430 A1 | 1/2010 | Oka |
| 2010/0034095 A1 | 2/2010 | Ho et al. |
| 2010/0062795 A1 | 3/2010 | Lee |
| 2010/0105334 A1 | 4/2010 | Terry et al. |
| 2010/0290400 A1 | 11/2010 | Lee et al. |
| 2011/0038376 A1 | 2/2011 | Wiemann et al. |
| 2011/0093754 A1 | 4/2011 | Chun et al. |

FOREIGN PATENT DOCUMENTS

| | | |
|---|---|---|
| CN | 1411668 | 4/2003 |
| CN | 1430359 | 7/2003 |
| CN | 1565140 | 1/2005 |
| CN | 1663158 | 8/2005 |
| DE | 10337828 | 4/2005 |
| EP | 0978958 | 2/2000 |
| EP | 1009184 | 6/2000 |
| EP | 1041850 | 10/2000 |
| EP | 1261222 | 11/2002 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |

| | | |
|---|---|---|
| EP | 1557968 | 7/2005 |
| EP | 1599063 | 11/2005 |
| EP | 1605724 | 12/2005 |
| EP | 1684538 | 7/2006 |
| JP | 6-013959 | 1/1994 |
| JP | 9-055693 | 2/1997 |
| JP | 1997-186704 | 7/1997 |
| JP | 9-327072 | 12/1997 |
| JP | 11-308671 | 11/1999 |
| JP | 11-331949 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002-135231 | 5/2002 |
| JP | 2002-374321 | 12/2002 |
| JP | 2002374321 | 12/2002 |
| JP | 2003-008635 | 1/2003 |
| JP | 2003008635 | 1/2003 |
| JP | 2003-116172 | 4/2003 |
| JP | 2003174470 | 6/2003 |
| JP | 2003333661 | 11/2003 |
| JP | 2004-128967 | 4/2004 |
| JP | 2004128967 | 4/2004 |
| JP | 2004-320165 | 11/2004 |
| JP | 2004-349884 | 12/2004 |
| JP | 2005-517369 | 6/2005 |
| JP | 2005-236988 | 9/2005 |
| JP | 2005-237013 | 9/2005 |
| JP | 2005-244958 | 9/2005 |
| JP | 2005278167 | 10/2005 |
| JP | 2005-536168 | 11/2005 |
| JP | 2005-539462 | 12/2005 |
| JP | 2005539462 | 12/2005 |
| JP | 2006-14372 | 1/2006 |
| JP | 2006-020044 | 1/2006 |
| JP | 2006-505998 | 2/2006 |
| JP | 2009-284532 | 12/2009 |
| KR | 10-2001-0111634 | 12/2001 |
| KR | 1020010111637 | 12/2001 |
| KR | 10-2004-0048675 | 6/2004 |
| KR | 10-2004-0064867 | 7/2004 |
| KR | 10-2004-0089937 | 10/2004 |
| RU | 2168278 | 5/2001 |
| RU | 2191479 | 10/2002 |
| RU | 2232469 | 7/2004 |
| RU | 2237380 | 9/2004 |
| RU | 2232477 | 10/2004 |
| RU | 2263415 | 10/2005 |
| RU | 2270526 | 2/2006 |
| RU | 2009106289 | 8/2010 |
| TW | 407407 | 10/2000 |
| TW | 552815 | 9/2003 |
| TW | 586283 | 5/2004 |
| TW | 589818 | 6/2004 |
| TW | 590340 | 6/2004 |
| TW | 592412 | 6/2004 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 200605549 | 2/2006 |
| WO | 94/09597 | 4/1994 |
| WO | 98/47302 | 10/1998 |
| WO | 99/44383 | 9/1999 |
| WO | 9960729 | 11/1999 |
| WO | 99/63713 | 12/1999 |
| WO | 01/05121 | 1/2001 |
| WO | WO 0135586 A1 * | 5/2001 |
| WO | 02/03720 | 1/2002 |
| WO | 02/39697 | 5/2002 |
| WO | 02/39760 | 5/2002 |
| WO | 02/43403 | 5/2002 |
| WO | 02/47417 | 6/2002 |
| WO | 02-075442 | 9/2002 |
| WO | 02-102110 | 12/2002 |
| WO | 03/007636 | 1/2003 |
| WO | 03/017691 | 2/2003 |
| WO | 03/043259 | 5/2003 |
| WO | 03/047155 | 6/2003 |
| WO | 03/056723 | 7/2003 |
| WO | 03/087978 | 10/2003 |
| WO | 03/096571 | 11/2003 |
| WO | 2004/030393 | 4/2004 |
| WO | 2004/034656 | 4/2004 |
| WO | 2004030393 | 4/2004 |
| WO | 2004045234 | 5/2004 |
| WO | 2004/075442 | 9/2004 |
| WO | 2004-089030 | 10/2004 |
| WO | 2005/006660 | 1/2005 |
| WO | 2005055472 | 6/2005 |
| WO | 2005/074312 | 8/2005 |
| WO | 2005/088886 | 9/2005 |
| WO | 2005-099125 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005-125125 | 12/2005 |

OTHER PUBLICATIONS

Huawei "Further considerations on multiplexing method of shared Control Channel in Uplink Single-Carrier FDMA" TSG-RAN WG1 #43, Nov. 7-11, 2005.

Fujitsu, et al. "Multiplexing method of shared control channel in uplink single-carrier FDMA radio access" TSG-RAN WG1 #42bis, Oct. 10-14, 2005.

Motorola: "Paging Channel Design for E-UTRA", 3GPP TSG-RAN WG1,R1-061712 [online] Jun. 27, 2006.

Sarka, S. et al.: Common-Channel Soft Handoff in cdma2000-The Paging Channel. IEEE Transactions on Microwave Theory and Techniques. Jun. 2000.

NTT DOCOMO, et al.: "Paging Channel Structure for E-UTRA Downlink", 3GPP TSG-RAN WG1, R1-060034 [online], Jan. 23, 2006.

Phillips: "Envolved Paging Indicators for LTE"; 3GPP TSG-RAN WG2 Meeting #49, Seoul, Korea, Nov. 7-11, 2005.

LG Electronics, Inc.: "Framing in the MAC Entity", 3GPP TSG-RAN WG2, R2-061012 [on-line], Mar. 27, 2006, Retrieved from the Internet.

LG Eletronics, Inc.: "HARQ and ARQ Operation", 3GPP TSG-RAN WG2, R2-060106, Jan. 9, 2006, Retrieved from the Internet.

Park, S.J., "Allocating Radio Resources in Mobile Communications System," U.S. Appl. No. 12/160,100, Mar. 7, 2008.

Chun, S.D., et al., "Data Transmission Method and Data Re-transmission Method," U.S. Appl. No. 12/961,451, Dec. 6, 2010.

China Mobile, "RRC States Analysis In LTE," 3GPP TSG RAN WG2#48, R2-052140, Aug. 29, 2005.

Panasonic, "E-UTRA Transport and Logical Channels," 3GPP TSG RAN WG2#49, R2-052860, Nov. 7, 2005.

Siemens, "States in E-UTRAN," 3GPP TSG-RAN WG RAN2#48, R2-052501, Aug. 29, 2005.

Qualcomm Europe, "Signaling Optimization for E-UTRAN," 3GPP TSG-RAN WG2 Meeting #48-bis, R2-052407, Oct. 10, 2005.

Zdarsky, et al "Handover in Mobile Communication Networks: Who is in control anyway?" Proceedings of the 30th Euromicro Conference, Aug. 31-Sep. 3, 2004.

Ericsson, "E-UTRA Random Access," TSG-RAN WG1 # 43, R1-051445, Nov. 7, 2005.

Ericsson, "E-UTRA Random Access," 3GPP TSG-RAN WG1 #43, R1-051445, XP003020952, Nov. 7, 2005.

Derryberry, R.T., et al., "Reverse High-Speed Packet Data Physical Layer Enhancements in CDMA2000 1xEV-DV," IEEE Communications Magazine, vol. 43, Issue 4, pp. 41-47, Apr. 18, 2005, XP001228792.

Chung, J., et al., "Packet Synchronization and Identification for Incremental Redundancy Transmission in FH-CDMA Systems,"

Third IEEE International Symposium on Personal, Indoor and Mobile Radio Communications, pp. 292-295, Oct. 19, 1992, XP01017082.

Xu, H., et al.; "Performance Analysis on the Radio Link Control Protocol of UMTS System"; 2002 IEEE 56th Vehicular Technology Conference Proceedings; pp. 2026-2030; Sep. 2002.

LG Electronics, Inc., "UE State transition in LTE_Active," 3GPP TSG-RAN WG2 #52, R2-061002, Mar. 2006, XP-050130928.

Ericsson, "LTE States in E-UTRAN," 3GPP TSG-RAN WG2 Meeting #48bis, R2-052425, Oct. 2005, XP-050129534.

Motorola et al., "MAC-e/es header and functional split," R2-042360, 3GPP TSG RAN WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

Qualcomm, "Need for MAC-hs segmentation mechanism," R2-020769, 3GPP TSG-RAN WG2 Meeting #28, Apr. 2002.

3rd Generation Partnership Project (3GPP), "LTE; Evolved Universal Terrestrial Radio Access (E-UTRA) Medium Access Control (MAC) Protocol Specification (Release 8)," 3GPP TS 36.321 v8.4.0, Jan. 2009.

3rd Generation Partnership Project (3GPP), "Universal Mobile Telecommunications System (UMTS); Radio Resource Control (RRC) protocol specification (3GPP TS 25.331 version 6.8.0 Release 6)," Dec. 2005.

* cited by examiner

METHOD FOR HANDOVER IN MOBILE COMMUNICATION SYSTEM

CROSS-REFERENCE TO RELATED APPLICATIONS

This application is a national stage application of International Application No. PCT/KR2006/004571, filed on Nov. 3, 2006, which claims the benefit of earlier filing date and right of priority to U.S. Provisional Application No. 60/757,063, filed on Jan. 5, 2006, and Korean Application No. 10-2006-0085190, filed on Sep. 5, 2006, the contents of all of which are hereby incorporated by reference herein in their entirety.

TECHNICAL FIELD

The present invention relates to a handover method for a mobile terminal, and more particularly to a handover method for a mobile terminal, such that it improves an access success rate of the mobile or wireless terminal.

BACKGROUND ART

Recently, many developers have conducted intensive research into a handover method for use in a variety of communication systems. A representative example of the communication systems is an Evolved Universal Mobile Telecommunications System (E-UMTS), such that a detailed description thereof will hereinafter be described.

FIG. 1 is a structural diagram illustrating an E-UMTS network. It should be noted that the E-UMTS network of FIG. 1 can be applied to the conventional art and the present invention. The E-UMTS is an evolved version of a convention UMTS system, and is being standardized by the 3GPP (3rd Generation Partnership Project). The E-UMTS may also be considered to be a Long Term Evolution (LTE) system.

The E-UMTS network may be generally classified into an Evolved UTRAN (E-UTRAN) and an Evolved Packet Core (EPC). The E-UTRAN includes a User Equipment (UE); a base station (hereinafter referred to as an "eNode-B"); and an Access Gateway (AG) located at the end of the network so that it is connected to an external network.

The AG may also be referred to as an MME/UPE (Mobility Management Entity/User Plane Entity) as necessary. The AG may be classified into a traffic processing unit and a control-traffic processing unit as necessary. In this case, a first AG for processing new user traffic data may communicate with a second AG for processing control traffic data via a new interface. A single eNode-B may include at least one cell as necessary. A interface for transmitting user traffic data or control traffic data may be located between several eNode-Bs.

The EPC may include the AG; and a node for registering users of other UEs, etc. If required, an interface capable of discriminating between the E-UTRAN and the EPC may be used. S1 interface is located between the eNode-B and the AG, such that a plurality of nodes may be interconnected between the eNode-B and the AG, resulting in the implementation of Many-to-Many connection structure. One eNode-B is connected to the other eNode-B via an X2 interface. The X2 interface is always located between neighboring eNode-Bs, resulting in the implementation of a meshed network.

Radio Interface Protocol (RIP) layers located between a UE (or a terminal) and a network may be classified into a first layer (L1), a second layer (L2) and a third layer (L3) on the basis of three lower layers of an Open System Interconnection (OSI) reference model well known to those skilled in the art. A physical layer contained in the first layer (L1) provides an Information Transfer Service (ITS) over a physical channel. A Radio Resource Control (RRC) layer located at the third layer (L3) controls radio resources between the UE and the network system. For this purpose, the RRC layer allows the UE to exchange RRC messages with the network system. The RRC layer of the E-UTRAN network (or the LTE system) is located at the eNode-B.

FIG. 2 is a conceptual diagram illustrating a radio interface protocol structure between the UE and the E-UTRAN (Evolved UMTS Terrestrial Radio Access Network) based on the 3GPP radio access network standard.

The radio interface protocol of FIG. 2 horizontally includes a physical layer, a data link layer, and a network layer. The radio interface protocol of FIG. 2 vertically includes a User Plane for transmitting data or information and a Control Plane for transmitting a control signal (also called "signaling data").

The protocol layers shown in FIG. 2 may be classified into the first layer (L1), the second layer (L2), and the third layer (L3) on the basis of three lower layers of an Open System Interconnection (OSI) reference model well known in the art.

The above-mentioned layers of the radio-protocol control plane and the radio protocol user plane will hereinafter be described in detail.

The physical layer acting as the first layer (L1) transmits an Information Transfer Service to an upper layer over a physical channel. The physical layer is connected to a Medium Access Control (MAC) layer acting as the upper layer via a transport channel. The MAC layer communicates with the physical layer over the transport channel, such that data is communicated between the MAC layer and the physical layer. Data is communicated among different physical layers. In more detail, data is communicated between a first physical layer of a transmission end and a second physical layer of a reception end.

The MAC layer of the second layer (L2) transmits a variety of services to the RLC (Radio Link Control) layer acting as the upper layer over a logical channel. The RLC layer of the second layer (L2) supports transmission of reliable data. A variety of functions of the RLC layer may also be implemented with a function block of the MAC layer. In this case, there is no RLC layer as necessary. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information. The PDCP layer is located at the AG in the E-UTRAN system The RRC (Radio Resource Control) layer located at the uppermost part of the third layer (L3) is defined by only the control plane. The RRC layer controls logical channels, transport channels, and physical channels in relation to configuration-, reconfiguration-, and release-operations of Radio Bearers (RBs). In this case, the RB is indicative of a service received from the second layer (L2) to implement data communication between the UE and the E-UTRAN.

There are downlink channels for transmitting data from the network to the UE, for example, a Broadcast Channel (BCH) for transmitting system information and a downlink Shared Channel (SCH) for transmitting user traffic data or control messages. The traffic data or control messages of a downlink multicast service or broadcast service may be transmitted over the downlink shared channel (SCH), or may also be transmitted over an additional multicast channel (MCH).

In the meantime, there are uplink channels for transmitting data from the UE to the network, for example, a Random Access Channel (RACH) and an uplink shared channel (SCH) for transmitting user traffic data or control messages.

FIG. 4 is a flow chart illustrating a handover method for controlling a UE to be handed over from a first eNode-B to a second eNode-B in the E-UTRAN system so as to continuously maintain an access state of the UE.

Referring to FIG. 4, UE context data includes area restriction information at step S401.

The UE performs a measurement process according to the measurement established in a source eNode-B, and performs a measurement control process at step S402.

The source eNode-B receives measurement information from the UE, and determines whether it will be handed over to a neighboring eNode-B (or a neighboring cell) on the basis of the received measurement information at step S403.

The source eNode-B transmits a handover (HO) request message to a target eNode-B at step S404.

The target eNode-B determines whether to receive the HO message in consideration of its own wired/wireless resources at step S405.

The target eNode-B transmits a handover (HO) response message to the source eNode-B at step S406.

The source eNode-B transmits a handover (HO) command to the UE at step S407.

Upon receiving the HO command from the source eNode-B, the UE performs a specific signaling process to connect the target eNode-B to the Layer 1 or Layer 2. The above-mentioned signaling process for the Layer 1 and the Layer 2 includes a specific process for acquiring (or gaining) synchronization between the UE and the eNode-B at step S408.

The UE connected to the Layer 1 and/or the Layer 2 transmits a handover (HO) complete message to the target eNode-B at step S409.

The target eNode-B transmits the HO complete message to the MME/UPE at step S410.

The MME/UPE transmits a handover (HO) complete acknowledgement (ACK) message to the target eNode-B at step S411.

The target eNode-B transmits a resource release message to the source eNode-B at step S412.

Upon receiving the resource release message from the target eNode-B, the source eNode-B releases all the resources at step S413.

The source eNode-B transmits the HO command to the UE, and transmits a downlink user-traffic block to the target eNode-B. In this case, the user-traffic block may be a user-traffic block transmitted from the PDCP layer of the MME/UPE, or may be a traffic block received in the RLC layer of the eNode-B such that a sequence number is added to the received traffic block. In this case, all the traffic blocks ranging from a minimum traffic block, which is incapable of completely recognizing whether the UE receives the traffic block, to the last traffic block are transmitted to the target eNode-B.

Detailed descriptions of an RRC connection process and a signal connection process will hereinafter be described.

Prior to the beginning of a call connection mode, the UE must be RRC-connected to the UTRAN, and must be signaling-connected to a CN. By means of the RRC connection and the signal connection, the UE exchanges its dedicated control information with the UTRAN or the CN.

FIG. 5 is a flow chart illustrating a method for transmitting messages exchanged between the UE and the RNC for the above-mentioned RRC connection and Initial Direct Transfer (IDT) messages for the above-mentioned signal connection.

In order to implement the above-mentioned RRC connection, the UE transmits an RRC connection request message to the RNC.

In reply to the RRC connection request message, the RNC transmits an RRC connection setup message to the UE.

The UE transmits an RRC connection setup complete message to the RNC.

If the above-mentioned processes are successfully completed, the RRC connection is implemented between the UE and the RNC.

If the RRC connection is completed, the UE transmits the IDT message, such that it begins to perform the signal connection.

A detailed description of a Random Access Channel (RACH) of a WCDMA system will hereinafter be described.

The Random Access Channel (RACH) is adapted to transmit small-sized data (i.e., short data) in an uplink direction. The random access channel (RACH) may also transmit a plurality of RRC messages, for example, an RRC connection request message, a cell update message, and a URA update message, etc.

Some logical channels (i.e., a Common Control Channel (CCCH), a Dedicated Control Channel (DCCH), and a Dedicated Traffic Channel (DTCH)) may be mapped to the radio access channel (RACH) acting as any one of transport channels. Also, the radio access channel (RACH) from among the transport channels is mapped to a Physical Random Access Channel (PRACH) acting as any one of physical channels.

FIG. 6 is a conceptual diagram illustrating operations of the physical random access channel (PRACH) according to the conventional art.

As can be seen from FIG. 6, an uplink physical channel (i.e., PRACH) includes a preamble part and a message part.

The preamble part performs a power-ramping function for suitably adjusting transport power (also called a "transmission power") to transmit messages, and prevents several UEs from colliding with each other. The message part performs transmission of a MAC PDU message transmitted from the MAC layer to the physical channel.

The UE's MAC layer commands the physical layer of the UE to perform the PRACH transmission. Thereafter, the UE's physical layer selects a single access slot and a single signature, and transmits the PRACH preamble part in an uplink direction.

The above-mentioned preamble is transmitted to a desired destination during an access-slot time of 1.33 ms. The UE selects one of 16 signatures during an initial specific-length time of the access slot, and transmits the selected signature.

If the UE transmits the preamble part, the eNode-B transmits a response signal over a AICH (Acquisition Indicator Channel) acting as any one of downlink physical-channels. The AICH for transmitting the response signal transmits the signature selected by the preamble during an initial specific-length time of the access slot corresponding to an access slot via which the preamble is transmitted.

In this case, the eNode-B transmits an ACK (acknowledged) or NACK (non-acknowledged) message to the UE via the signature transmitted over the AICH. If the UE receives the ACK message, the UE transmits the message part of 10 ms or 20 ms using an OVSF code corresponding to the above-mentioned transmitted signature. If the UE receives the NACK message, the MAC layer of the UE commands the UE's physical layer to re-transmit the PRACH messages after the lapse of a predetermined period of time.

In the meantime, if the UE does not receive the AICH messages corresponding to the above-mentioned transmitted preamble, it transmits a new preamble at power one-step higher than that of the previous preamble after the lapse of a predetermined access slot.

FIG. 7 is a block diagram illustrating a conventional AICH structure.

The AICH acting as one of downlink physical channels will hereinafter be described with reference to FIG. 7.

The acquisition indicator channel (AICH) transmits a 16-symbol signature Si (i=0 . . . 15) during a time of an access slot corresponding to 5120 chips. In this case, the UE selects a single signature (Si) from among a plurality of signature ($S_0$~$S_{15}$), and transmits the selected signature Si during an initial time corresponding to 4096 chips. The UE determines a specific period having the length of the remaining 1024 chips to be a transmission-power OFF period having no transmission symbols. In the meantime, similar to FIG. 4, a preamble part of PRACH acting as any one of uplink physical channels transmits the 16-symbol signature Si (i=0 . . . 15) during a time of an access slot corresponding to 4096 chips.

Disclosure of Invention

Accordingly, the present invention is directed to a handover method for a mobile communication system that substantially obviates one or more problems due to limitations and disadvantages of the related art.

An object of the present invention devised to solve the problem lies on a handover method having an improved or evolved function.

Another object of the present invention devised to solve the problem lies on a method for transmitting/receiving control information to acquire an improved handover function.

The object of the present invention can be achieved by providing a handover method for a mobile communication system equipped with a plurality of eNode-Bs, the method comprising: receiving a handover (HO) command message, which includes user equipment's (UE's) handover-resource information received from a second eNode-B, from a first eNode-B connected to the UE; and controlling the UE to be handed over from the first eNode-B to the second eNode-B using the received handover-resource information.

In another aspect of the present invention, provided herein is a handover method for a mobile communication system equipped with a plurality of eNode-Bs, the method comprising: assigning, by a second eNode-B, resources for a handover of a User Equipment (UE) connected to a first eNode-B; transmitting information of the handover resources to the first eNode-B; transmitting the handover-resource information to the UE via the first eNode-B; and establishing a connection between the UE and the second eNode-B using the handover-resource information.

Therefore, if the UE desires to access a new eNode-B, the eNode-B assigns different (or differential) wired/wireless resources to the UE in consideration of QoS and/or UE priority, resulting in the implementation of a guaranteed QoS of the UE.

In this case, the differential wired/wireless resources may be wired/wireless resources for connection to the eNode-B to which the UE is to be handed over.

Preferably, the above-mentioned resources may be firstly assigned to the UE which desires to access the eNode-B due to a handover reason at an earlier time than other UEs which desires to access the eNode-B due to the remaining reasons other than the handover reason.

It is to be understood that both the foregoing general description and the following detailed description of the present invention are exemplary and explanatory and are intended to provide further explanation of the invention as claimed.

Advantageous Effects

The handover method for a mobile communication system according to the present invention has the following effects.

If the UE desires to access a new eNode-B, a communication unit according to the present invention controls the UE to access the new eNode-B using assigned resources determined by considering QoS or UE priority, such that it minimally reduces a delay time encountered when the UE is handed over to the new eNode-B, resulting in increased data transmission efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
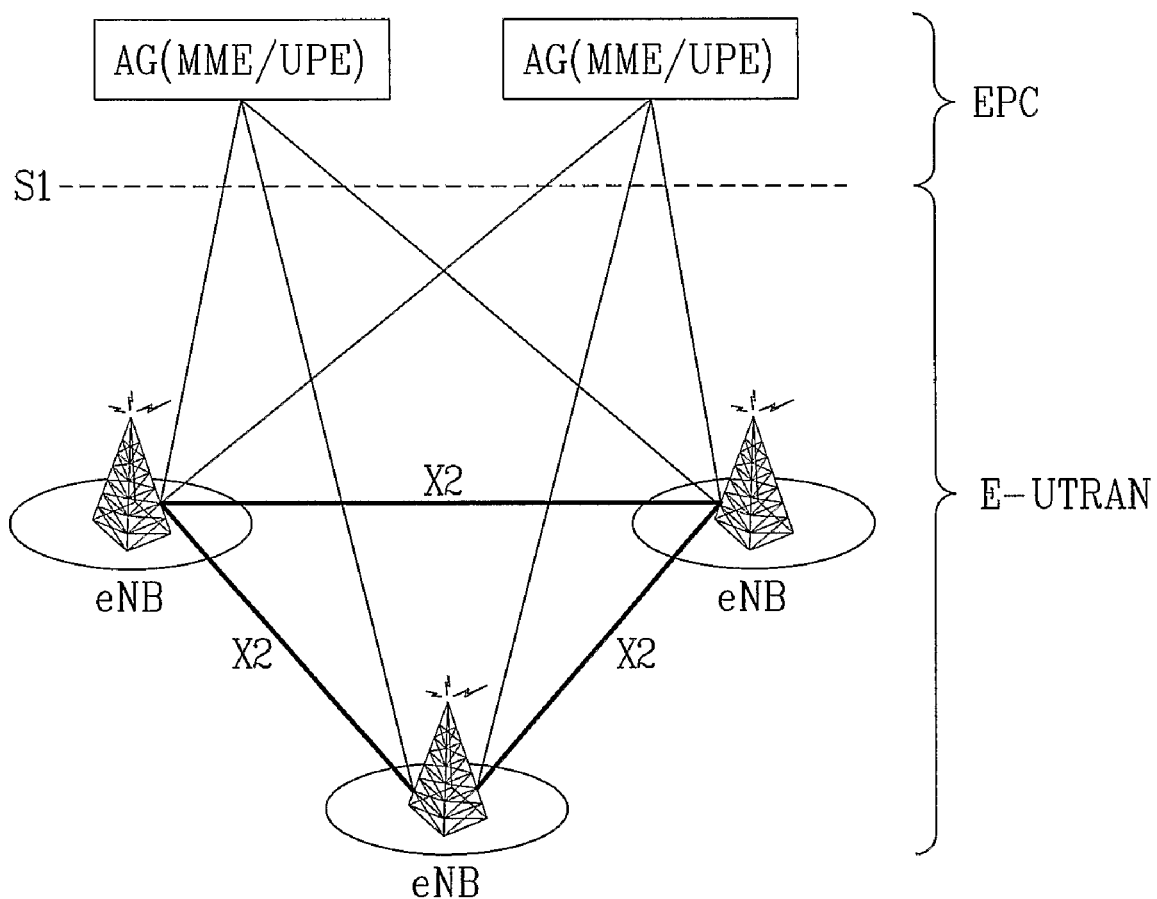
FIG. 1 is a structural diagram illustrating an E-UMTS network.
Figure 2:
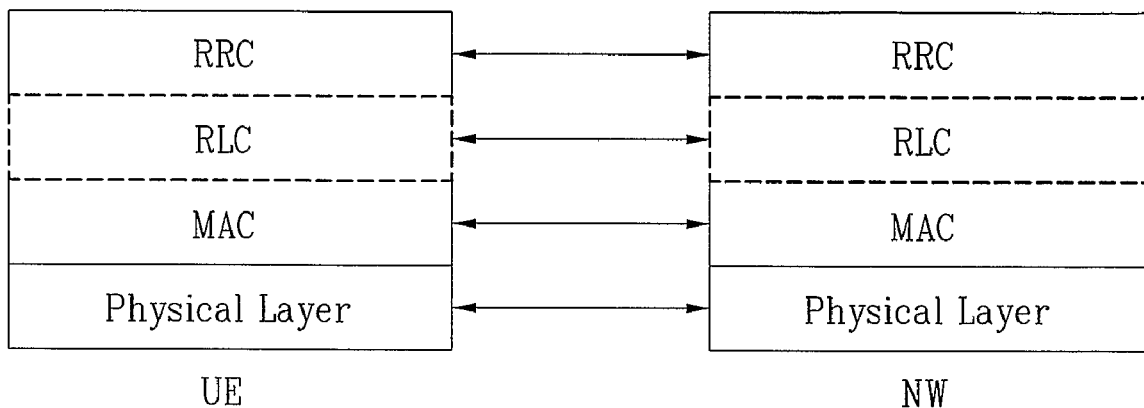
FIG. 2 is a conceptual diagram illustrating a control plane of a radio interface protocol structure between a UE and an E-UTRAN (Evolved UMTS Terrestrial Radio Access Network) based on the 3GPP radio access network standard.
Figure 3:
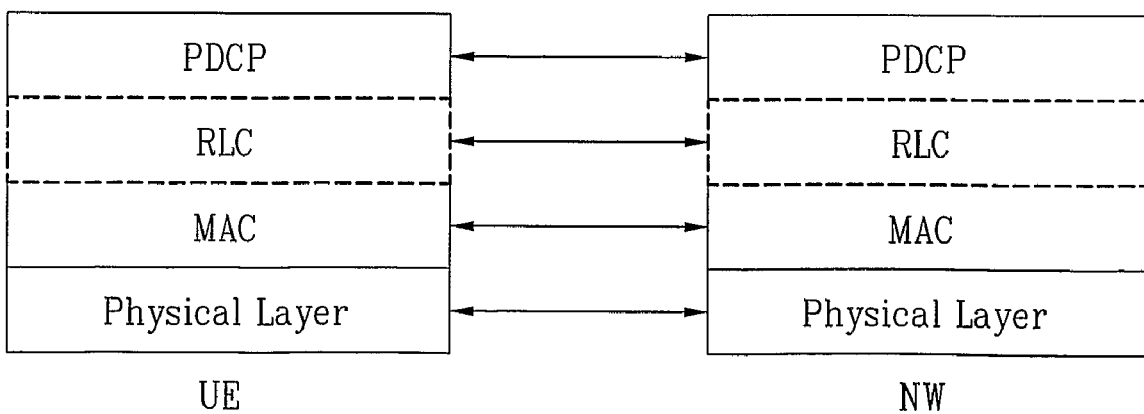
FIG. 3 is a block diagram illustrating a User Plane of a radio interface protocol.
Figure 4:
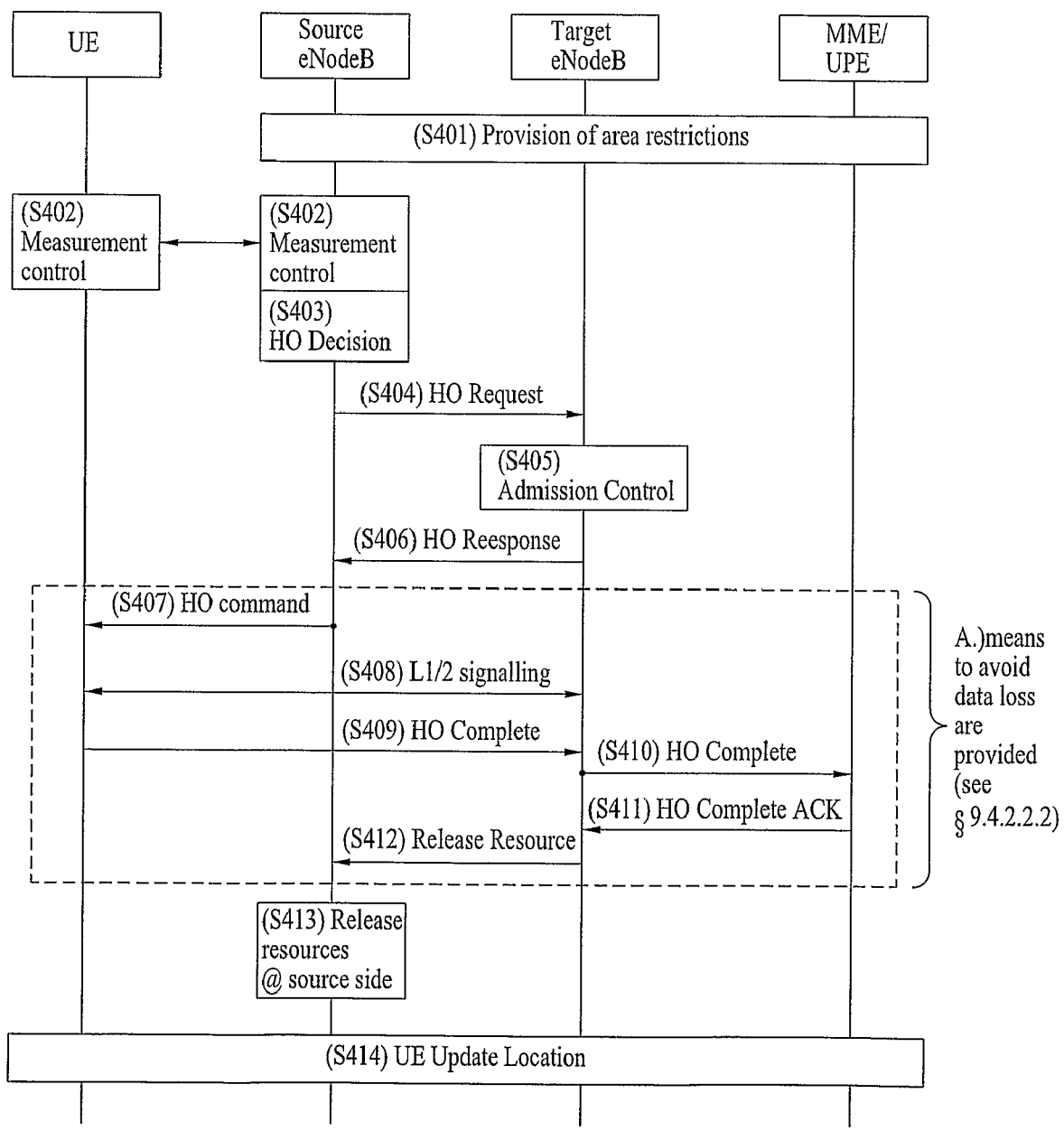
FIG. 4 is a flow chart illustrating a conventional handover method of a mobile terminal.
Figure 5:
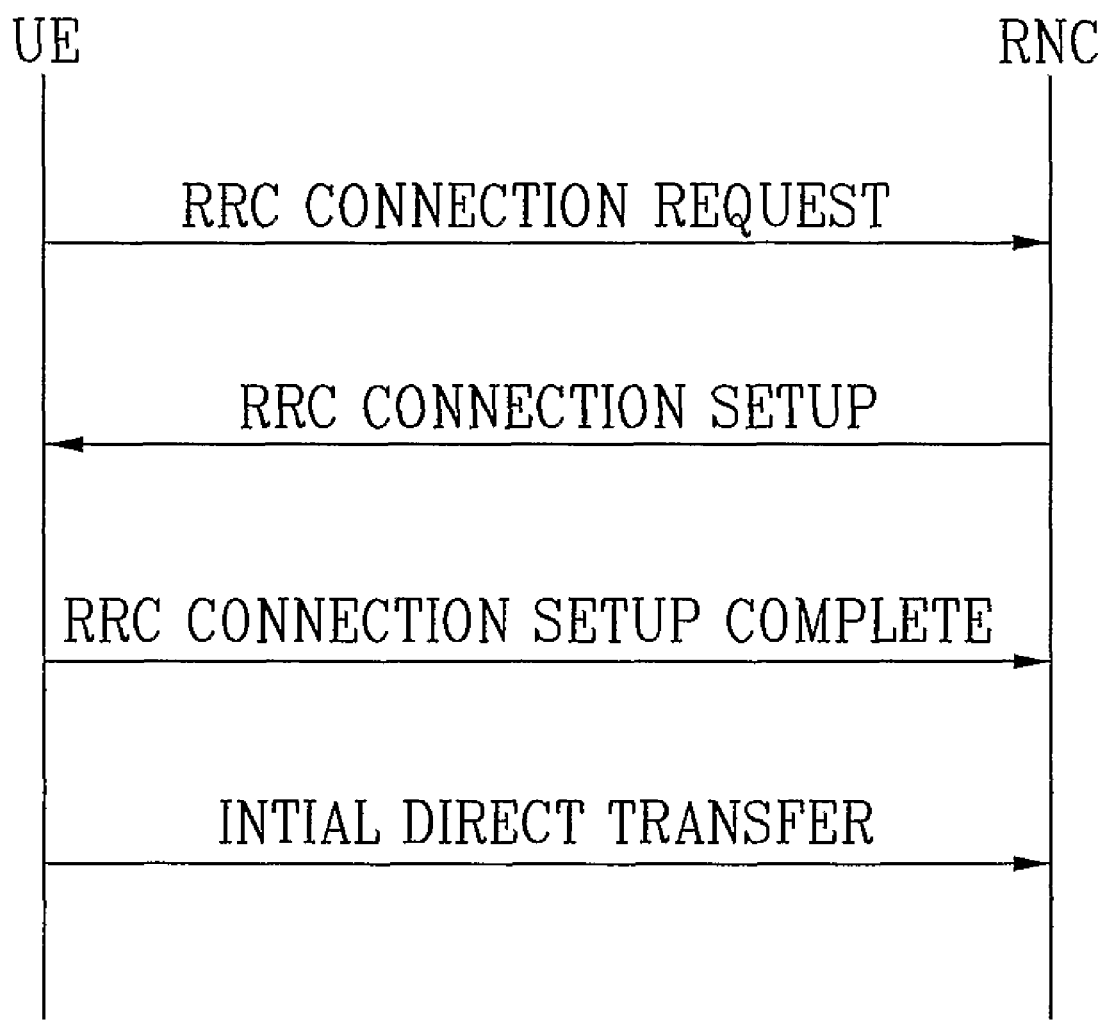
FIG. 5 is a flow chart illustrating a conventional RRC connection method.
Figure 6:
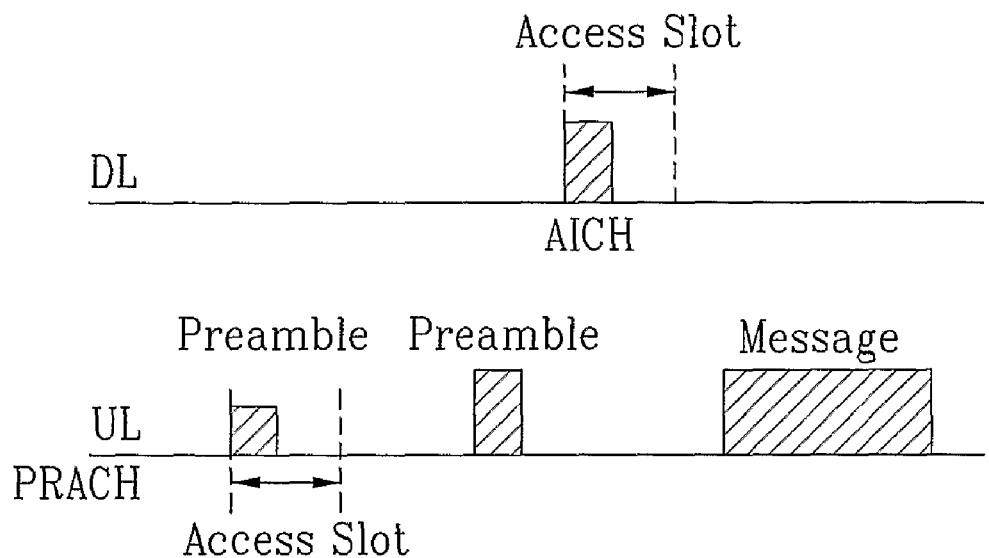
FIG. 6 is a conceptual diagram illustrating operations of a conventional physical random access channel (PRACH)
Figure 7:
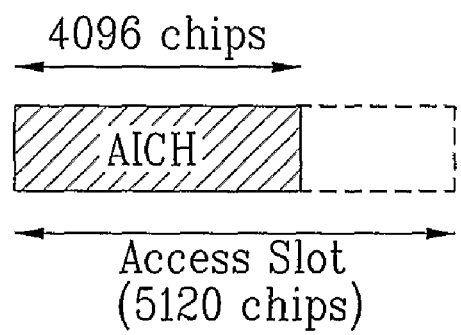
FIG. 7 is a conceptual diagram illustrating a conventional AICH (Acquisition Indicator Channel) structure.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that the handover method according to the present invention has the following characteristics.

Firstly, if a specific UE attempts to be handed over from a current eNode-B (e.g., a first eNode-B) to another eNode-B (e.g., a second eNode-B), the specific UE and the remaining UEs attempt to access the second eNode-B using the same resources. In other words, the above-mentioned specific UE attempts to access the second eNode-B using the same resources along with the remaining UEs, without considering a Quality of Service (QoS) to be transmitted to the specific UE.

The above-mentioned characteristics may have a negative influence upon a specific-state UE. This is because an activated UE must continuously transmit/receive traffic data to satisfy the QoS requirements and must minimally maintain a call-failure time (also called a call disconnection time) while being handed over from one eNode-B to another eNode-B.

The above-mentioned characteristics may have a negative influence upon a UE receiving a specific service. A service for transmitting/receiving traffic data in real time must firstly guarantee the QoS (Quality of Service).

However, if all the UEs transmit access request signals to a specific eNode-B using the same resources, an access delay may occur, such that the QoS may not be guaranteed due to the access delay.

The present invention relates to a handover method capable of considering the UE's characteristics. Characteristics, operations, and effects of the present invention will be described with reference to the annexed drawings.

The handover method, and a method for transmitting/receiving control information for the handover will hereinafter be described with reference to the annexed drawings.

As previously stated above, the present invention differentially assigns wired/wireless resources in consideration of a Quality of Service (QoS). The above-mentioned QoS may be classified into different QoSs according to categories of services to be provided to the UE.

For example, a real-time service acting as a representative example of the services must guarantee a minimum delay time. In this case, the wireless UE may have priority. The priority may be differentially assigned to individual UEs, or some priority levels may also be assigned to the UEs.

For example, a priority No. 1 (i.e., a first priority) may be assigned to UEs (A, B, and C), and a priority No. 2 (i.e., a second priority) may be assigned to other UEs (D, E, and F). The UEs (A, B, and C) corresponding to the priority No. 1 may receive necessary services from the system at a time earlier than that of the other UEs (D, E, and F). The priority of the UE may also be established when the UE accesses the network.

Figure 8A:
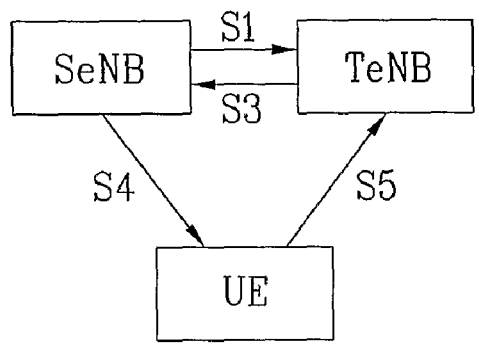
FIG. 8A is a block diagram illustrating a communication unit for performing a handover function according to the present invention.

FIG. 8A is a block diagram illustrating a communication unit for performing a handover function according to the present invention.

According to the present invention, in order to guarantee a QoS (Quality of Service) provided to the UE which desires to be handed over to a target eNode-B (denoted by "TeNB" in FIG. 8A), communication resources (i.e., wired/wireless resources) determined by the UE's QoS and the UE's priority are assigned to the UE. The above-mentioned communication-resource assignment is a unique characteristic of the present invention.

In more detail, it is preferable for the above-mentioned communication resources to be differentially assigned to the UEs according to access reasons of the UEs which desire to access the target eNode-B (TeNB). Preferably, communication resources prescribed for fast access may be assigned to a specific UE handed over to the target eNode-B (TeNB).

If the UE of FIG. 8A is handed over to the target eNode-B (TeNB), the source eNode-B (denoted by "SeNB") transmits a handover (HO) request to the target eNode-B (TeNB) at step S1.

Preferably, the target eNode-B (TeNB) of FIG. 8A receives the UE's HO request from the source eNode-B (SeNB), and may perform assignment of communication resources to be used for an access mode between the UE and the target eNode-B according to at least one of the UE's priority and the QoS at step S2.

The above-mentioned assigned communication resources may also be employed when the UE performs the initial access process. For example, the UE may also employ the above-mentioned communication resources to perform the RACH (Random Access Channel) access process after receiving the HO command from the source eNode-B (SeNB).

Also, the above-mentioned assigned communication resources may be assigned-time information or assigned-frequency information. The above-mentioned assigned communication resources may indicate a power level to be used for the UE, or may also indicate a specific access slot.

Preferably, the target eNode-B (TeNB) of FIG. 8A may transmit resource assignment information for the UE's handover to the source eNode-B (SeNB) at step S3. More preferably, the above-mentioned resource assignment information may be contained in the HO response message. Also, the above-mentioned resource assignment information may also be contained in other messages transmitted from the target eNode-B (TeNB) to the source eNode-B (SeNB).

The source eNode-B (SeNB) of FIG. 8A transmits the resource assignment information to the UE at step S4. Preferably, the resource assignment information may be contained in the HO command message, such that the HO command message including the resource assignment information may be transmitted to the UE. Also, the above-mentioned resource assignment information may also be contained in other messages transmitted from the source eNode-B (SeNB) to the UE.

The UE of FIG. 8A receives resource information assigned by the target eNode-B (TeNB) from the source eNode-B (SeNB) at step S4. The UE performs an initial access process to the target eNode-B (TeNB) using the above-mentioned assigned resource information.

The resources for implementing an access (or connection state) between the UE and the target eNode-B (TeNB) may be differentially assigned according to access reasons of the UE which desires to access the target eNode-B (TeNB). In more detail, due to other purposes, the above-mentioned resources may have an access success rate higher than that of other resources assigned to the remaining UEs who attempt to access the target eNode-B (TeNB), resulting in reduction of a delay time.

In brief, it is preferable that the communication resources having different access success rates according to access reasons of the UE who desires to access the target eNode-B (TeNB) may be assigned. The above-mentioned access success rate may be changed according to a variety of factors, i.e., a transmission power between the UE and the eNode-B, frequency bands of the UE and the eNode-B, and communication assignment times of the UE and the eNode-B. Therefore, a higher power, a larger frequency-band, and a longer time may be assigned to the UE to be handed over from one eNode-B to another eNode-B, such that different access success rates can be implemented.

If the UE receives the above-mentioned resources, it is connected to the target eNode-B (TeNB) according to the assigned resources at step S5.

Figure 8B:
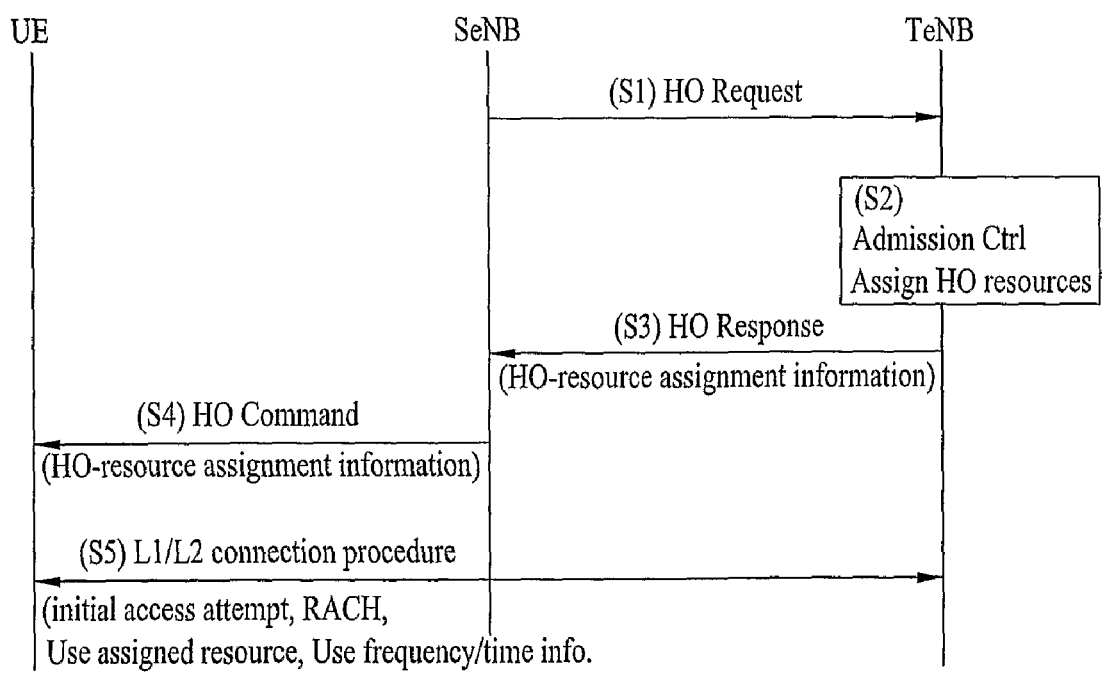
FIG. 8B is a flow chart illustrating a handover method according to the present invention.

FIG. 8B is a flow chart illustrating a handover method according to the present invention.

Referring to FIG. 8B, the source eNode-B (SeNB) determines the presence or absence of the necessity of the handover, and transmits the HO request message to the target eNode-B (TeNB) at step S1.

In this case, the HO request message may also transmit other information associated with the UE to be handed over. For example, the HO request message may include a variety of information capable of identifying the above-mentioned UE.

The target eNode-B (TeNB) performs assignment of resources for the UE having transmitted the handover (HO) request in consideration of QoS- and priority-information of the UE at step S2. In reply to the handover (HO) request, the target eNode-B (TeNB) transmits the HO response message at step S3. In this case, the HO response message may also include information associated with the assigned resources for the above-mentioned handover UE.

The source eNode-B (SeNB) transmits the HO command message to the UE at step S4. In this case, the HO command message may include assignment information of resources to be used for connection between the UE and the target eNode-B (TeNB).

The UE attempts to access the target eNode-B (TeNB) using the resource assignment information received from the source eNode-B (SeNB) at step S5.

A detailed description of resources assigned by the eNode-B, particularly, the target eNode-B (TeNB) will hereinafter be described.

Generally, if a UE is powered on and desires to access a new cell via the handover, the UE is connected to the new cell via the initial access process. In this case, the initial access process may be executed by a random access process. Generally, the above-mentioned random access process assumes the presence of collision probability, such that all the UEs attempt to access the cell using the same resources. Therefore, all the UEs who attempt to access the cell can be theoretically connected to the cell at the same access probability.

However, in the case of a handover (such as a handover of an activated UE), there is a need to satisfy a Quality of Service (QoS) or to consider priority of UEs. For this purpose, the communication unit differentially employs resources assigned for the initial access attempt.

For example, compared with a power for a general initial access, the UE for the handover access may attempt to perform the initial access at a higher power. In this case, the communication unit may assign different powers to individual UEs in consideration of the QoS and the priority of the UEs.

Communication resources (e.g., assigned-frequency and time) for the general initial access may be assigned to a wider or larger area. Generally, the probability of access may be higher than that of a general case in which the UE attempts to access the new cell using a wider or larger bandwidth. If required, a specific access slot may also be pre-assigned to the UE to facilitate the access process, such that the UE may attempt to access the new cell (i.e., the target eNode-B (TeNB)) using the specific access slot.

The resources pre-assigned by the target eNode-B (TeNB) may be adjusted to be valid during only a predetermined period of time. Therefore, although the UE cannot access the target eNode-B (TeNB) or is unable to access the target eNode-B (TeNB) due to the handover failure, the communication unit can prevent the resources from being unnecessarily wasted. For example, if a predetermined period of time is added to an expected time during which the UE will transmit the HO request, such that a timer may be applied to perform assignment of handover-associated resources for a corresponding UE. If the UE does not transmit the HO request during the predetermined period of time, the communication unit determines that a corresponding handover request fails, such that it releases the assigned resources.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

As apparent from the above description, the handover method for a mobile communication system according to the present invention has the following effects.

If the UE desires to access a new eNode-B, a communication unit according to the present invention controls the UE to access the new eNode-B using assigned resources determined by considering QoS or UE priority, such that it minimally reduces a delay time encountered when the UE is handed over to the new eNode-B, resulting in increased data transmission efficiency.

What is claimed is:

1. A method for receiving control information for a handover in a mobile communication system, the method comprising:
   receiving a handover command including handover resource information for a mobile station from a first base station, wherein the handover resource information is provided by a second base station to the first base station; and
   establishing a connection with the second base station by performing a random access procedure for the handover using the handover resource information,
   wherein the handover resource information includes information indicating a mobile station transmission power level to be allocated to the mobile station, and
   wherein the mobile station transmission power level to be allocated to the mobile station is higher than a second mobile station transmission power level to be allocated to at least one other mobile station for an attempt to perform a random access procedure to establish an initial connection with the second base station.

2. The method of claim 1, wherein the handover resource information further includes information related to radio resources allocated according to quality of at least one service to be provided to the mobile station.

3. The method of claim 1, wherein the handover resource information further includes information related to radio resources allocated according to priority of the mobile station.

4. The method of claim 1, wherein the first base station is a source base station and the second base station is a target base station.

5. The method of claim 1, wherein radio resources allocated by the handover resource information are valid for a predetermined time.

6. The method of claim 5, wherein the predetermined time is set by the second base station.

7. A method for transmitting control information for a handover in a mobile communication system, the method comprising:
   transmitting, by a first base station connected to a mobile station, a handover request to a second base station;
   receiving, by the first base station, handover resource information for the mobile station via a handover response from the second base station; and
   transmitting, by the first base station, the handover resource information to the mobile station via a handover command, to facilitate performance of a random access procedure by the mobile station for the handover in order to establish a connection with the second base station,
   wherein the handover resource information includes information indicating a mobile station transmission power level to be allocated to the mobile station, and
   wherein the mobile station transmission power level to be allocated to the mobile station is higher than a second mobile station transmission power level to be allocated to at least one other mobile stations for an attempt to perform a random access procedure to establish an initial connection with the second base station.

8. The method of claim 7, further comprising:
performing, by the second base station, a connection procedure with the mobile station according to radio resources included in the handover resource information.

9. The method of claim 7, wherein the handover resource information further includes information related to radio resources allocated according to quality of at least one service to be provided to the mobile station.

10. The method of claim 7, wherein the handover resource information further includes information related to radio resources allocated according to priority of the mobile station.

11. The method of claim 7, wherein the first base station is a source base station and the second base station is a target base station.

12. The method of claim 7, wherein radio resources allocated by the handover resource information are valid for a predetermined time.

13. The method of claim 12, wherein the predetermined time is set by the second base station.

* * * * *